United States Patent
Tessmer et al.

(10) Patent No.: US 10,560,380 B2
(45) Date of Patent: Feb. 11, 2020

(54) METHOD FOR IMPROVING THROUGHPUT FOR ENCAPSULATED NETWORK TRAFFIC

(71) Applicant: NICIRA, INC., Palo Alto, CA (US)

(72) Inventors: Alex Tessmer, Palo Alto, CA (US); Samuel Jacob, Palo Alto, CA (US); Srikar Tati, Palo Alto, CA (US); Subin Cyriac Mathew, Palo Alto, CA (US); Aditya Sonthy, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 238 days.

(21) Appl. No.: 15/693,052

(22) Filed: Aug. 31, 2017

(65) Prior Publication Data
US 2019/0068496 A1 Feb. 28, 2019

(51) Int. Cl.
*H04L 12/741* (2013.01)
*H04L 29/06* (2006.01)

(52) U.S. Cl.
CPC .............. *H04L 45/74* (2013.01); *H04L 69/22* (2013.01); *H04L 2212/00* (2013.01)

(58) Field of Classification Search
None
See application file for complete search history.

(56) References Cited

U.S. PATENT DOCUMENTS 9,590,820 B1 * 3/2017 Shukla ................. H04L 12/4633
9,769,011 B2 * 9/2017 Jain ..................... H04L 12/4633
10,212,089 B1 * 2/2019 Narayanan ............ H04L 47/125
2015/0124821 A1 * 5/2015 Chu ........................ H04L 45/22
370/392

(Continued)

OTHER PUBLICATIONS

T. Mallory et al., "Incremental Updating of the Internet Checksum", Network Working Group, Request for Comments 1141, dated Jan. 1990, 3 pages.

(Continued)

*Primary Examiner* — Ayaz Sheikh
*Assistant Examiner* — Faiyazkhan Ghafoerkhan
(74) *Attorney, Agent, or Firm* — Hickman Palermo Becker Bingham LLP; Malgorzata A. Kulczycka

(57) ABSTRACT

An approach for improving throughput for encapsulated network traffic is provided. In an embodiment, a method comprises obtaining a plurality of network addresses of a plurality of intermediaries that facilitate communications between a plurality of virtual machines. A set of source-destination intermediary pairs is determined based on the plurality of network addresses, and for each source-destination intermediary pair, from the set of source-destination intermediary pairs, a precomputed encapsulated header is generated and included in a set of precomputed encapsulated headers. If a data packet from a particular source intermediary and destined to a particular destination intermediary is received, and a particular precomputed encapsulated header for the particular source intermediary and the particular destination intermediary is included in the set of precomputed encapsulated headers, then the particular precomputed encapsulated header is retrieved from the set of precomputed encapsulated headers and used to form a particular encapsulated packet.

20 Claims, 10 Drawing Sheets

(56) References Cited

U.S. PATENT DOCUMENTS

| | | | |
|---|---|---|---|
| 2015/0124822 A1* | 5/2015 | Chu | H04L 45/22 370/392 |
| 2015/0124828 A1* | 5/2015 | Cj | H04L 12/4633 370/392 |
| 2015/0381494 A1* | 12/2015 | Cherian | H04L 45/745 370/392 |
| 2015/0381495 A1* | 12/2015 | Cherian | H04L 45/745 370/392 |
| 2016/0087885 A1* | 3/2016 | Tripathi | G06F 9/45558 370/389 |
| 2018/0139124 A1* | 5/2018 | Chu | H04L 45/22 |

OTHER PUBLICATIONS

Braden et al., "Computing the Internet Checksum", Network Working Group, Request for Comments: 1071, dated Sep. 1988, 24 pages.

* cited by examiner

| 412 Example Forwarding Table That is Accessible to VTEP1 | | | |
|---|---|---|---|
| VM4 MAC4 | VTEP4 IP4 | VTEP4 MAC4 | Segment ID (VNI) |

420 → VM4 MAC4
422 → VTEP4 IP4
424 → VTEP4 MAC4
426 → Segment ID (VNI)

FIG. 4A

| 432 Example Forwarding Table That is Accessible to VTEP4 | | | |
|---|---|---|---|
| VM1 MAC1 | VTEP1 IP1 | VTEP1 MAC1 | Segment ID (VNI) |

440 → VM1 MAC1
442 → VTEP1 IP1
444 → VTEP1 MAC1
446 → Segment ID (VNI)

FIG. 4B

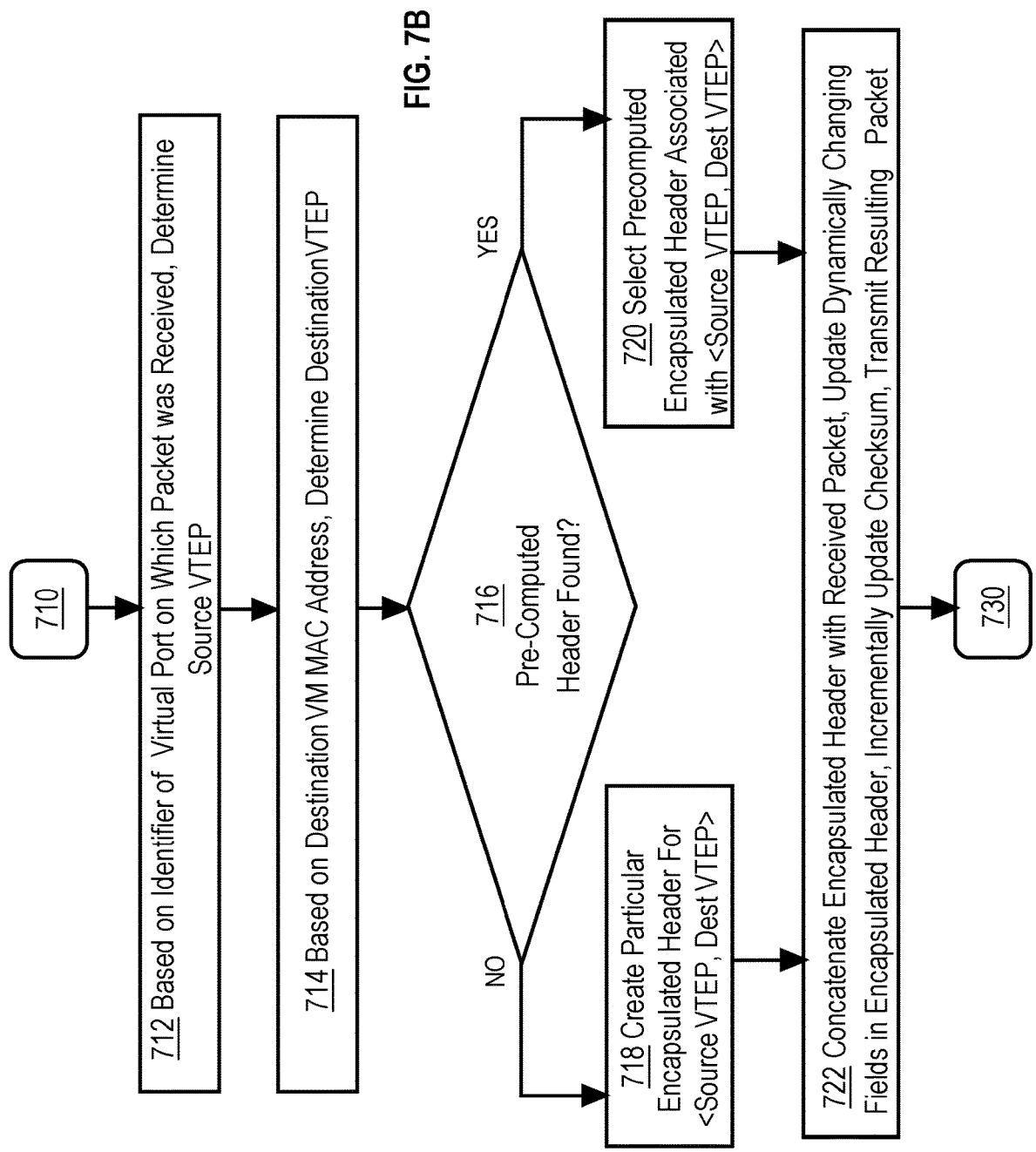

METHOD FOR IMPROVING THROUGHPUT FOR ENCAPSULATED NETWORK TRAFFIC

BACKGROUND

In software-defined datacenters, overlay networks are created over the physical network infrastructure to simplify the networks' provisioning and reconfiguring. The overlay networks usually include virtual machines and switches, and communications between the virtual machines are usually realized by encapsulating data packets communicated between the machines. Upon receiving data packets from source virtual machines, the switches encapsulate the packets, and forward the encapsulated packets to other switches via the physical network infrastructure underlay. Upon receiving the encapsulated packets, the switches decapsulate the packets, and forward the decapsulated packets to destination virtual machines.

While the concept of encapsulating and decapsulating data packets in virtual networks appears to be straightforward, in practice—the process is usually time consuming and taxing on computer resources. It also places significant demands on overall throughput of the network traffic.

BRIEF DESCRIPTION OF THE DRAWINGS

In the drawings:

FIG. 4A depicts an example forwarding table accessible to a virtual tunnel endpoint;

FIG. 4B depicts an example forwarding table accessible to a virtual tunnel endpoint;

FIG. 7B depicts an example process for using precomputed encapsulated headers;

DETAILED DESCRIPTION

Figure 1:
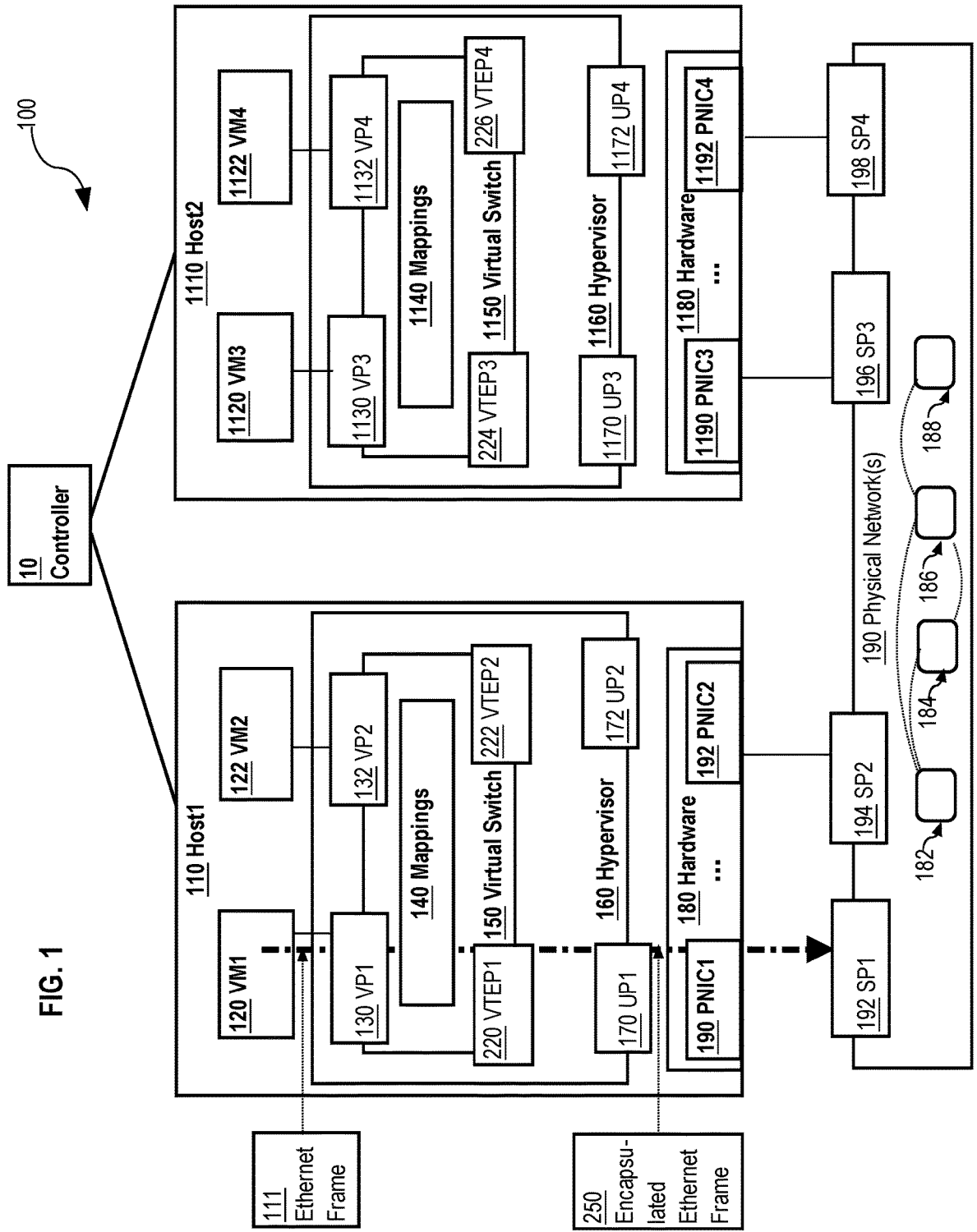
FIG. 1 is a block diagram depicting an example system architecture for improving throughput for encapsulated network traffic.

In the following description, for the purposes of explanation, numerous specific details are set forth in order to provide a thorough understanding of the presently described method. It will be apparent, however, that the present approach may be practiced without these specific details. In other instances, well-known structures and devices are shown in block diagram form to avoid unnecessarily obscuring the present approach.

General Overview

Techniques are described herein for improving throughput for encapsulated network traffic. In an embodiment, an approach is presented for precomputing encapsulated headers in advance, and using the precomputed encapsulated headers later to construct encapsulated data packets when devices and machines communicate with each other. Because the encapsulated headers are precomputed in advance, the process of encapsulating data packets using the already precomputed encapsulated headers is faster and more efficient than if the headers were generated anew each time a data packet is received.

In an embodiment, the approach is applicable to communications between physical and virtual entities in any type of communications network. That may include communications between virtual machines in overlay virtual networks, or communications between any types of virtual entities. In the case of virtual networks, encapsulated headers are precomputed before virtual machines start communicating with each other. Then, when source virtual machines send their data packets toward destination virtual machines, the data packets are encapsulated with the already precomputed encapsulated headers. Since the encapsulated headers are precomputed in advance, encapsulating the received data packets using the precomputed encapsulated headers may be performed quicker, more efficiently and using a smaller count of CPU cycles than if the headers were computed anew each time a data packet is received. Since a typical overlay network may use thousands of encapsulated headers, using the encapsulated headers precomputed in advance significantly improves the traffic throughput in the computer network.

The techniques described herein allow precomputing encapsulated headers in advance because a count of encapsulated headers needed in an already configured network can be calculated in advance. It has been observed that an overlay network usually includes a finite count of entities that facilitate communications between machines in the network. Let us refer to those entities as intermediaries. Non-limiting examples of intermediaries include VXLAN tunnel endpoints (VTEPs) that are described in detail later. While the techniques described herein are presented by way of example with VXLAN tunneling protocol, they are as applicable to other tunneling protocols, as described in further detail below. Usually, many virtual machines are served by the same VTEP. The number of VTEPs may be a couple of order of magnitude greater than the number of hosts/hypervisors. A host typically has one VTEP per physical port, so most may have at most 2-4 VTEPs. But the number of virtual machines may ten-times, or even hundred-times, greater than the number of hosts and are served by these VTEPs. Since the count of VTEPs is finite, so is the count of possible combinations between source VTEPs and destination VTEPs. Since the count of possible <source VTEP, destination VTEP> pairs is finite, so is the count of encapsulated headers that are needed to encapsulate data traffic in the network.

Although certain embodiments herein are described in reference to VTEPs, the presented approach is not limited just to VTEPs. The approach is also applicable to other types of intermediaries and other types of communications networks. For example, the approach may be applicable to various types of virtual switches, various types of hypervisors, and various types of other components of communications networks.

Usually the same pair of a source VTEP and a destination VTEP handles data packets sent by a source virtual machine to a destination virtual machine. Therefore, encapsulated headers may be precomputed in advance for all ordered pairs of <source VTEP, destination VTEP>. Since a typical datacenter may serve thousands of virtual machines, having the precomputed encapsulated headers for all pairs of <source VTEP, destination VTEP> significantly improves throughput of data traffic in the network.

Precomputing encapsulated headers is usually preceded by collecting, or otherwise obtaining, information about network addresses of the sources and destinations. The collected information is then used to precompute the headers. Non-limiting examples of network addresses include Internet Protocol (IP) addresses and media access control (MAC) addresses; however, the approach may also implement other types of network addresses and other types of encapsulation schemes.

Each VTEP may have an associated IP address and an MAC address, and the addresses may be provided by a network controller when the VTEP is powered on, or may be obtained using an address resolution approach, such as the ARP-based approach. Once the IP addresses and MAC addresses of the VTEPs are known, a finite count of combinations between source VTEPs and destination VTEPs may be determined. Once the finite count of the combinations is determined, the corresponding encapsulated headers may be precomputed.

Typically, when a VTEP is powered on, the VTEP is assigned its own IP address and its own MAC address, but may not know network addresses of other VTEPs and other virtual machines deployed in the network. These addresses, however, may be discovered, or otherwise obtained, when at least one virtual machine sends a broadcast message to resolve network addresses of other virtual machines. Non-limiting examples of the broadcast message include an ARP request.

A broadcast ARP request may be received from a source virtual machine by a source VTEP. The source VTEP may encapsulate the request, and broadcast the encapsulated request to other VTEPs in the overlay networks. The encapsulating of the broadcast request does not involve using a precomputed encapsulated header because such headers are not available yet, and because the broadcast request is not directed to a particular destination.

An ARP request may be encapsulated with various headers, including for example, some outer headers and a Virtual Extensible LAN (VXLAN) header. The VXLAN header may include several fields, and one of the fields may be used to store a VXLAN network identifier (VNI). A VNI is an identifier of the logical network via which a source virtual machine may communicate with a destination virtual machine. The VNIs are specified according to the adopted naming convention, and a non-limiting example of a VNI is VXLAN 5001.

Upon receiving the encapsulated broadcast request, the VTEPs may decapsulate the request, and forward the decapsulated request to their corresponding virtual machines, which may then respond with unicast messages. Upon receiving the unicast messages, the VTEPs may parse the unicast responses and use the parsed information to construct their corresponding forwarding tables. Then, the VTEPs may encapsulate the unicast responses and transmit the encapsulated unicast responses to the source VTEP that sent the ARP broadcast message. Upon receiving the encapsulated unicast responses, the source VTEP may parse the received responses, and use the parsed information to construct its own forwarding table. Details of the process for constructing forwarding tables are described in FIG. 4A-4B.

The resulting forwarding tables provide the VTEPs with network addresses of virtual machines and other VTEPs deployed in the network. They may also be used to determine a finite count of pairs of source VTEPs and destination VTEPs. Once the pairs of <source VTEP, destination VTEP> are known, the encapsulated headers for the pairs are precomputed. Therefore, by the time two virtual machines start communicating with each other, the corresponding encapsulated headers for such communications are already precomputed. Thus, the need for precomputing an encapsulated header each time a data packet is received is avoided.

Example Computer System Architecture

FIG. 1 is a block diagram depicting an example system architecture for improving throughput for encapsulated network traffic. A depicted system architecture 100 is provided to illustrate one of many implementations; according to other implementations, the system architecture may include additional and/or alternative components that are not shown in FIG. 1.

In the example depicted in FIG. 1, system architecture 100 includes a controller 10, and a plurality of hosts, including Host1 110 and Host2 1110. Other hosts (not depicted in FIG. 1) may also be included in system 100. The hosts are interconnected via one or more physical networks 190, which may include various routers 182, 186 and/or various switches 184, 188 interconnected in a variety of ways.

Host1 110 and Host2 1110 may be implemented as any types of computing devices, servers, or computing systems. The hosts may include hardware and software components, and may provide support for a plurality of virtual machines.

Controllers

Controller 10 is a network management entity that facilitates network virtualization in system 100. It may be implemented with the functionalities to configure virtual machines on Host1 110, Host2 1110 and other hosts (not depicted in FIG. 1) Controller 10 may for example, assign network addresses to the virtual machines, VTEPs, and ports. It may also coordinate updates and reconfigurations of the virtual environment in system 100.

Virtual Machines

FIG. 1 depicts system architecture 100 that includes a VM1 120 and a VM2 122 that are implemented on Host1 110, and a VM3 1120 and a VM4 1122 that are implemented on Host2 1110. Although FIG. 1 depicts four virtual machines, according to other implementations, system architecture 100 may include any number of virtual machines and any number of hosts, and each host may support any number of virtual machines.

Virtual machines VM1, VM2, VM3, VM4, and possibly additional virtual machines implemented in system 100, may be realized as complete computational environments, containing virtual equivalents of hardware and software components of the physical computing systems.

Virtual machines VM1, VM2, VM3, VM4 may be instantiated as virtualized computing instances. The instances may be equipped with their own resources, may be assigned their own workloads, and may be configured to perform their own tasks associated with the workloads. Virtual resources allocated to the virtual machines may include virtual CPUs, virtual memory, virtual disks, virtual network interface controllers and the like. Virtual machines VM1, VM2, VM3 and VM4 may be configured to execute guest operating systems and guest applications.

A virtualized computing instance may be realized as a hardware virtualization and/or a software virtualization. As a hardware virtualization, it may represent for example, an addressable data compute node. As a software virtualization, it may be used to provide for example, an isolated user space instance. Virtualized computing instances may include containers running on a top of the host operating system, virtual private servers, client computers, and hybrid combinations of thereof.

Hypervisors

FIG. 1 depicts system architecture 100 that includes a hypervisor 160 and a hypervisor 1160. A hypervisor may be implemented as a software layer or a component that supports execution of multiple virtualized computing instances. In the depicted example, hypervisor 160 supports execution of VM1 120 and VM2 122, and communications to and from VM1-VM2; while hypervisor 1160 supports execution of VM3 1120 and VM4 1122, and communications to and from VM3-VM4. Other configurations, not depicted in FIG. 1, may include additional hypervisors, additional virtual machines and different hypervisor-virtual machine configurations.

Hypervisors 160, 1160 may maintain respective mappings between hardware components 180, 1180 of Host1 110 and Host2 1110, respectively, and virtual resources allocated to VM1-VM4.

Hardware Components

Hardware components 180, 1180 may include hardware processors, memory units, data storage units, and physical network interfaces, not all of which are depicted in FIG. 1. Hardware components 180, 1180 may also include physical network interface controllers (PNICs) that are depicted in FIG. 1, and that may provide connectivity to routers 182, 186, and switches 184, 188 of one or more physical networks 190. While the example depicted in FIG. 1 shows two routers 182, 186 and two switches 184, 188, physical networks 190 may include any number of routers and switches. Furthermore, while the example depicted in FIG. 1 shows that a hardware component 180 includes two or more PNICs 190, 192 and a hardware component 1180 includes two or more PNICs 1190, 1192, each hardware component may have any number of PNICs.

In an embodiment depicted in FIG. 1, PNIC1 190 and PNIC2 192 are connected to switch ports SP1 192 and SP2 194, respectively; while PNIC3 1190 and PNIC4 1192 are connected to switch ports SP3 196 and SP4 198, respectively. Data communications from hypervisor 160 may be uploaded via an uplink port UP1 170 to PNIC1 190, and/or via uplink port UP2 172 to PNIC2 192. Data communications from hypervisor 1160 may be uploaded via an uplink port UP3 1170 to PNIC3 1190, and/or via uplink port UP4 1172 to PNIC4 1192. In other embodiments, the ports and PNICs may be configured or arranged differently as long as a 1:1 mapping between the uplink ports and the PNICs is preserved.

Virtual Switches

Host1 110 and Host2 1110 of system 100 may include virtual switches 150, 1150. A virtual switch may represent a logical connectivity between virtual ports. For example, a virtual switch 150 may be configured to detect, on a virtual port VP1 130, outgoing (egress) data packets received from VM1 120. Virtual switch 150 may also be configured to determine communications paths for routing the data packets to their destinations.

The term "data packet' in this context refers generally to a data unit that forms a single package that travels along a given communications path. Unless otherwise specified, the term "data packet" is loosely used herein to cover any type of data units exchanged in compliance with any type of communications protocols. While the term "data packet" is typically used for data communications units exchanged at the Layer-3 (L3 in the Open Systems Interconnection (OSI) Model), and the term "data frame" is typically used for data communications units exchanged at the Layer-2 (L2 in the OSI Model), merely for simplicity—both terms are used interchangeably throughout the disclosure. Also, merely for simplicity, the description of precomputing encapsulated headers herein includes references to precomputing encapsulated headers for data packets even though the approach may be implemented to precompute encapsulated headers also for data frames, data segments, and other types of communications units.

Implementations of virtual switches may vary and may depend on a type of product in which the switch is deployed as a virtualization medium. For example, a virtual switch may be implemented as a part of a hypervisor, as it is depicted in FIG. 1, and as it is usually implemented in the vSphere® and KVM® lines of products. Alternatively, although not depicted in FIG. 1, a virtual switch may be implemented as a hardware component, or as part of a user space, or as part of a space that is dedicated to a virtual machine and that is under the control of the virtual machine. Examples of such implementations include the Hyper-V® and Xen® lines of products.

To facilitate forwarding of data packets, virtual switches 150, 1150, may acquire, extract, and/or otherwise obtain network addresses of sources of the data packet and network addresses of destinations of the data packet. The switches may also obtain headers for the data packets, encapsulate the data packets with the obtained headers, and transmit the encapsulated data packets toward the packets' destinations.

In an embodiment, virtual switches 150, 1150, delegate acquiring and obtaining network addresses, precomputing encapsulated headers, and encapsulating received data packets with the precomputed headers to VTEPs.

Tunnel EndPoints

A tunnel endpoint is an endpoint that terminates a tunnel, such as a VXLAN tunnel. VXLAN is a network virtualization technology that may utilize a plurality of VTEPs and a plurality of virtual machines. Each VTEP may support one or more virtual machines. VXLAN tunnel endpoints encapsulate MAC-based OSI L2 Ethernet "inner" data frames with "outer" Layer-4 of the OSI UDP/IP segments.

In the example depicted in FIG. 1, virtual switch 150 includes a VTEP1 220 and a VTEP2 222; while virtual switch 1150 includes a VTEP3 224 and a VTEP4 226. Other configurations may include additional VTEPs or different sets of VTEPs.

A VTEP is usually configured to receive its own network addresses. For example, when a VTEP is powered on, the VTEP may be configured with its own MAC address and its own IP address. The addresses may be configured using different approaches. According to one approach, the addresses are configured on the VTEP by controller 10.

A VTEP may be configured to receive an L2 data frame on a virtual port, and based on the virtual port, determine a MAC address of a source virtual machine that sent the frame. Correspondence between the MAC addresses and the port identifiers for all virtual machines that the VTEP supports may be stored in a mapping or other type of data structure.

A VTEP may be configured to collect information about network addresses of other VTEPs and other virtual machines. An example process for collecting the network addresses is described in FIG. 4A-4B.

Based on the information collected by a VTEP, or otherwise available to the VTEP, the VTEP may precompute encapsulated headers. An example process for precomputing the encapsulated headers is described in FIG. 7A-7B. The VTEP may store the precomputed encapsulated headers, and use them to facilitate communications between virtual machines deployed in the network. For example, once a source VTEP receives a data packet from a source virtual machine and destined to a destination virtual machine, the source VTEP may parse the received data packet to identify a VNI of the virtual network via which the source and the destination virtual machines are to communicate. The source VTEP may use the VNI to determine a destination VTEP, retrieve a particular, precomputed encapsulated header associated with a <source VTEP, destination VTEP> pair, use the precomputed header to form an encapsulated data packet, and transmit the encapsulated packet toward the destination.

In the example depicted in FIG. 1, virtual switch 150 may be configured to receive an Ethernet data frame 111 from VM1 120, encapsulate the received Ethernet data frame 111 into an Ethernet frame 250 using the processes described below, and cause encapsulated Ethernet frame 250 to be transmitted toward a destination VM4 1122.

Encapsulating Ethernet Data Frames

In an embodiment, encapsulated headers are precomputed to expedite the process of generating encapsulated data frames, or packets, when virtual machines start communicating with each other. The process of data encapsulation is described herein with references to encapsulating the Ethernet data frames. However, the approach may be also implemented for encapsulating data packets, data segments, and the like. Indeed, the process may be implemented for any types of virtual networks and any types of communications protocols. For example, the approach may be extended to the NVGRE-, STT-, Geneve-, and GRE-based overlay networks. Furthermore, the approach may be extended to the IPv6 protocol, and the like.

In the case of the Ethernet frames, when a source virtual machine starts communicating with a destination source virtual machine, an Ethernet data frame is received by a source VTEP, or other type of intermediary. The VTEP, or other intermediary, encapsulates the received Ethernet data frame, and forms an encapsulated data frame. The encapsulated frame is then provided to a physical port, and then to physical network 190 that transmits the encapsulated frame to its destination.

An encapsulated data frame includes a new encapsulated (or "outer") header and the original Ethernet data frame received from the source virtual machine. Since some of the values in the new outer header may be known or obtained before the virtual machines start communicating with each other, at least a portion of the outer header may be precomputed in advance.

Figure 2:
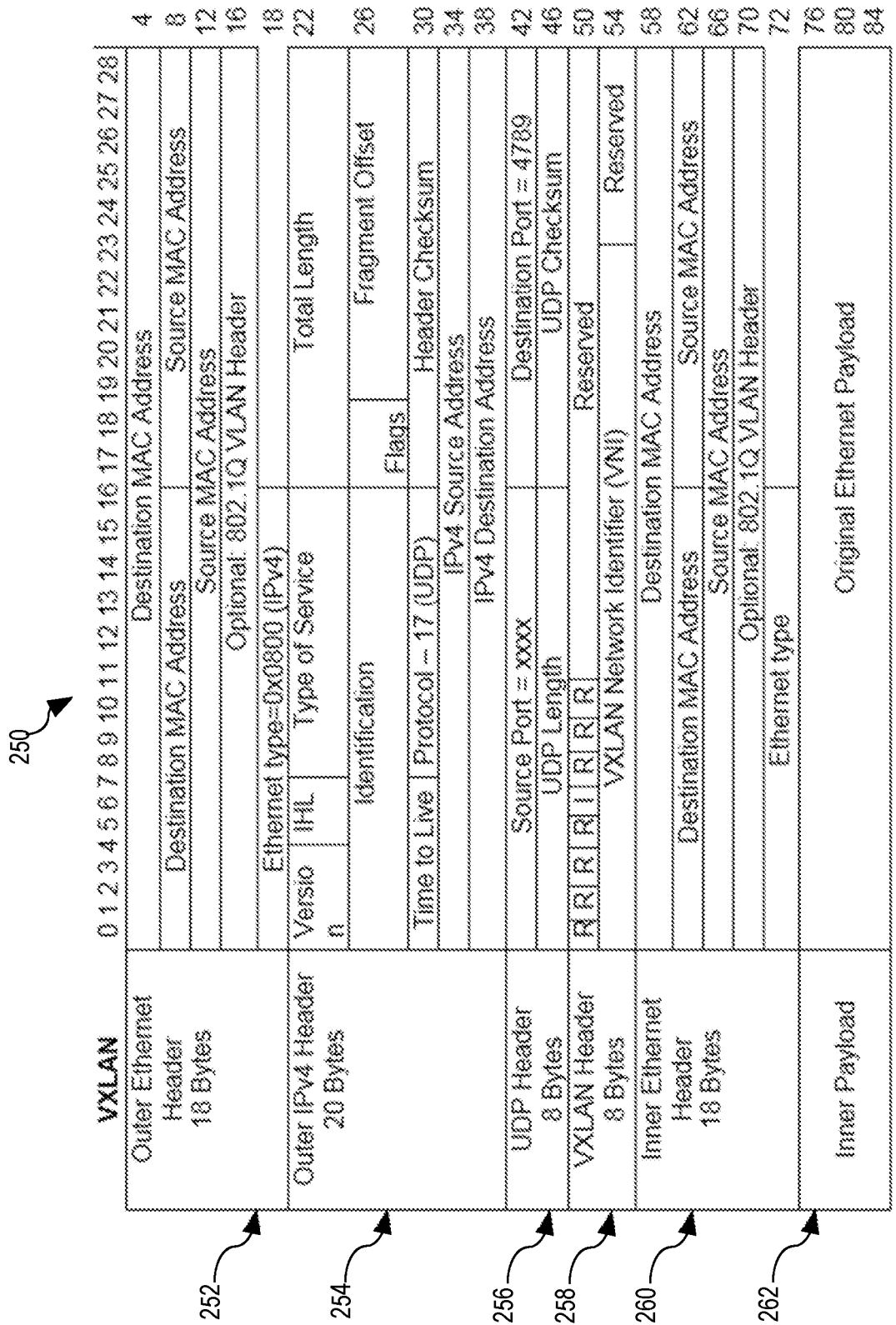
FIG. 2 depicts an example VXLAN Encapsulated Ethernet Frame.

FIG. 2 depicts an example VXLAN-encapsulated Ethernet data frame 250. Merely to simplify the description herein, encapsulated data frame 250 may also be referred to herein as an encapsulated packet 250. Frame 250 is described herein to merely outline the encapsulation process and to recall the terms that are later on used to describe the process of precomputing outer encapsulation headers.

Frame 250 includes an outer Ethernet header 252, an outer IPv4 header 254, an UDP header 256, a VXLAN header 258, an inner Ethernet header 260, and an inner payload 262. Inner Ethernet header 260 and inner payload 262 may correspond to an original Ethernet frame 111 described in FIG. 1. From the perspective of the VXLAN, inner Ethernet header 260 and inner payload 262 form an inner payload of packet 250. In the context of the virtual machines, inner payload 262 usually contains data that a source virtual machine is sending to a destination virtual machine. In some situations, inner payload 262 may be empty.

Inner Ethernet header 260 includes a destination MAC address, a source MAC address, an 802.1Q VLAN Header (optionally), and an Ethernet type field. In the context of the virtual machines, the destination MAC address is a destination MAC address of a destination virtual machine, and the source MAC address is a source MAC address of a source virtual machine.

The headers 252, 254, 256 and 258 are usually added by a VXLAN tunnel endpoint or other intermediary that handles the communications between the source virtual machine and the destination virtual machine.

Contents of most of the headers, except for a total length and a header checksum, may be pre-computed in advance by VTEPs because that contents do not depend on contents the inner packet. For example, MAC and IP addresses of the VTEPs may be known from the corresponding forwarding tables as the VTEPs construct their own forwarding tables. The version may be set to four. The IHL may be set to five. The type of service may be set to zero; however, that may change. The identification field may be set to zero. The fragment offset may be set to zero. The TTL may be set to 64. The protocol identifier may be set to seventeen to indicate the UDP, assuming that VXLAN uses the UDP. The Ethernet type may be set to 0x0800 for IPv4 packets. Therefore, at least the contents of the above fields may be precomputed in advance.

The total length and thus the checksum also depend on the inner payload length, and therefore, the total length and the checksum change as the total length of the received packet changes.

A header checksum in outer IPv4 header 254 may be initially set to zero, and then incrementally updated as new packets are communicated between virtual machines. Therefore, the header checksum in outer IPv4 header 254 may be at least partially precomputed in advance, and become a part of the precomputed outer encapsulation header.

UDP header 256 includes a source port field, a destination port field, an UDP header length, and a UDP checksum field.

VXLAN header 258 is usually added by a VXLAN tunnel endpoint, and includes several control bits, a couple of reserved fields, and a VXLAN identifier (VNI). A VNI is usually configured on a VTEP by a controller or using other mechanisms.

In an embodiment, for every Ethernet data frame sent out by a source virtual machine, VXLAN adds 54 bytes of new headers to facilitate the delivery of the frame from the source to the destination. The path between the source VTEP and the destination VTEP may include several intermediate systems, including one or more routers and/or one or more switches. Intermediate systems perform intermediate forwarding based on the new header.

Generating Encapsulation Headers

Figure 3:
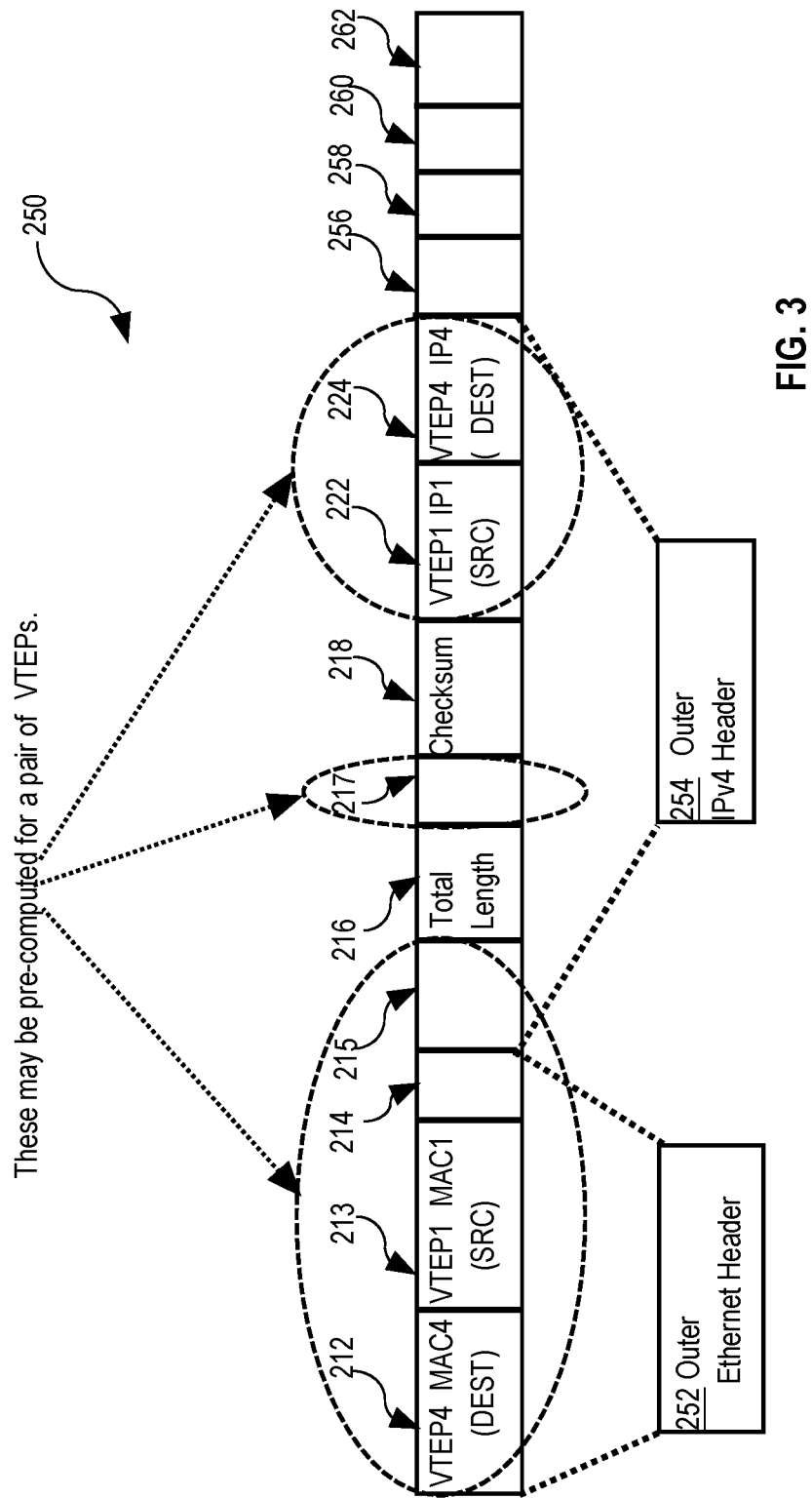
FIG. 3 depicts an example process for generating an encapsulated header for an encapsulated data packet.

FIG. 3 depicts an example process for generating an outer encapsulation header for an encapsulated data packet. The example depicted in FIG. 3 shows an outer header for an encapsulated packet similar to frame 250 described in FIG. 2. It is assumed herein that MAC addresses and IP addresses of a source VTEP and a destination VTEP are known. Merely to illustrate an example, it is also assumed that a source VM1 is communicating with a destination VM4, that an Ethernet data frame from the source VM1 was received by a source VTEP1, and that the Ethernet data frame is intended to the destination VM4 that is served by a destination VTEP4. Furthermore, it is assumed that a MAC address of the source VTEP1 is MAC1, an IP address of the source VTEP1 is IP1, a MAC address of the destination VTEP4 is MAC4, and an IP address of the destination VTEP4 is IP4.

As depicted in FIG. 2-3, encapsulated Ethernet packet/frame 250 includes outer Ethernet header 252, outer IPv4 header 254, UDP header 256, VXLAN header 258, inner Ethernet header 260, and inner payload 262. Outer Ethernet header 252, outer IPv4 header 254, UDP header 256, and VXLAN header 258 form an outer encapsulation header of encapsulated Ethernet packet 250.

From the perspective of the VXLAN, inner Ethernet header 260 and inner payload 262 form an inner payload of packet 250. Headers 252-258 are added to facilitate forwarding of Ethernet data frame 111 toward the frame's destination on the physical network underlay.

VXLAN header 258 comprises a VNI. A VNI specifies an identifier of a virtual network that facilitates communications between a source virtual machine and a destination virtual machine. VNIs are usually configured on VTEPs by a controller. The controller, acting as a management entity, may configure any number of virtual machines, on any number of physical hosts, for the same VNI. Similar to a VLAN ID tag, the VNI indicates that two VMs sharing the same VNI can communicate with one another over a common broadcast domain, and that such communication is isolated from other VMs or endpoints that do not share the same VNI. In the case of VXLAN (and other tunneling protocols) the broadcast domain may be a logical Layer 2 network that is wholly decoupled from the physical network infrastructure, and potentially spans multiple physical Layer 2 networks using the outer encapsulation header.

Assuming that the network addresses of a source VTEP1 are MAC1 and IP1, and the network addresses of a destination VTEP4 are MAC4 and IP4, a portion of outer Ethernet header 252 may be precomputed by including in outer Ethernet header 252 the following: a destination VTEP4 MAC4 address 212 and a source VTEP1 MAC1 address 213; and by including in outer IPv4 header 254 the following: a source VTEP1 IP1 address 222 and a destination VTEP4 IP4 224. The precomputed values may form a part of a precomputed encapsulation header.

Fields 214-218 may include a version field, an IHL field, a type of service field, a total length field (field 216), an identification field, flag fields, a fragment offset field, a time to live (TTL) field, a protocol identifier field, and a header checksum field (a field 218).

Some of the fields 214-218 may be precomputed, or at least partially precomputed. For example, a header checksum field 218 of outer IPv4 header 254 may be initially set to zero, and then incrementally updated as new packets destined to a destination virtual machine are received from a source virtual machine. Therefore, header checksum field 218 may be at least partially precomputed in advance, and become part of a precomputed encapsulation header.

Constructing Forwarding Tables

A process for precomputing encapsulation headers may utilize various types of information available to virtual switches and/or VTEPs. For example, a VTEP may utilize information about the VTEP's own addresses, information about the addresses of other VTEPs, and information about the addresses of the virtual machines instantiated in the network. Some information may be automatically configured on the VTEPs, some other may be obtained by sending communications to other VTEPs and parsing the received communications. The VTEPs may store the information in its own configuration files and/or its own forwarding tables. The information may be later used to precompute encapsulation headers for data packets transmitted via the network.

Information about network addresses assigned to a VTEP is usually configured on the VTEP by a controller. These addresses may include a VTEP IP address and a VTEP MAC address. For example, VTEP1 220 may be configured with its own VTEP1 IP1 address and VTEP1 MAC1 address when VTEP1 220 is powered on.

Information about network addresses of virtual machines may be obtained by identifying virtual ports on which communications from the virtual machines were received. For example, VTEP1 220 may determine a VM1 MAC1 address of VM1 120 by determining that data packets from VM1 120 are received on VP1 130.

Information about other VTEPs and other virtual machines may be obtained by a VTEP by communicating with other VTEPs and receiving responses from the VTEPs. The received data may be stored by the VTEP in a forwarding table.

A VTEP may create its own forwarding table in a variety of ways. One way includes utilizing information obtained by the VTEP from the VTEP's virtual ports and utilizing information obtained by the VTEP by exchanging communications in compliance with for example, the ARP protocol. An example process for generating a forwarding table is explained below in reference to VTEP1 220 and VTEP4 226; however, other VTEPs may update their own forwarding tables using similar processes.

FIG. 4A depicts an example forwarding table created by VTEP1 220, and FIG. 4B depicts an example forwarding table created by VTEP4 226. Once the VTEPs are powered on, the VTEPs may connect to a logical L2 network, identified as for example, as VNI 5001, and join a multicast group having an IP address for example, 239.1.1.100. At this point, a forwarding table 412 accessible to VTEP1 220 and a forwarding table 432 accessible to VTEP4 226 are empty. Let us assume that VTEP1 220 is assigned a VTEP1 IP1 address of 10.20.10.10, and VTEP4 226 is assigned a VTEP4 IP4 address of 10.20.10.11. Collecting information for the forwarding tables may be initiated by sending an ARP request by any of the virtual machines. Each virtual machine may respond to the ARP request, and the information received in ARP requests and received in responses to the ARP requests may be used to create forwarding tables.

Let us assume that VM1 120 sends an ARP request to find MAC addresses of other virtual machines. The ARP request may be an Ethernet broadcast packet, and may include a source MAC address of VM1 120, and a broadcast destination MAC address of for example, "FFFFFFFFFF."

Upon receiving the ARP request from VM1 120, VTEP1 220 encapsulates the ARP broadcast packet with a UDP header, and creates an outer header. The outer header may include a multicast MAC address as a destination VTEP MAC address, a VTEP1 MAC1 address as a source VTEP MAC address, the multicast address "239.1.1.100" as a destination VTEP IP address, the VTEP1 IP1 address "10.20.10.10" as a source VTEP IP address, and the VXLAN identifier "5001." Then, the physical network delivers the multicast packet to the hosts that joined the multicast group address "239.1.1.100".

Another method for sending such inner packets to VTEPs and virtual machines includes a source replication. According to the source replication approach, a controller may disseminate to hosts a list of destination VTEPs that serve at least one virtual machine for a given VNI. In response to receiving the list, the hosts may create individual encapsulated packets, one for each destination VTEP, and send the encapsulated inner packets separately to other hosts.

Let us assume that VTEP4 226 on Host2 1110 received the multicast packet. Based on the outer and inner headers of the received multicast packet, VTEP4 226 generates an entry for its own forwarding table 432. Forwarding table 432 may now include a VM1 MAC1 address 440 that is derived from the inner header of the multicast packet, a VTEP1 IP1 address 442 that is "10.20.10.10" and that is derived from the outer header of the multicast packet, a VTEP1 MAC1 address 444 that is derived from the outer header of the multicast packet, and a VNI 446 that is the VXLAN identifier 5001. The packet may then be decapsulated and delivered to VM4 1122. VM4 1122 may respond by sending a unicast packet toward VM1 120.

Upon receiving the unicast packet from VM4 1122, VTEP4 226 encapsulates the unicast packet with a UDP header, and creates an outer header. Specifically, VTEP4 226 may perform a lookup of forwarding table 432, and find an entry in forwarding table 432 for the particular VNI, extract VM1 MAC1 440, VTEP1 IP1 442 (e.g., 10.20.10.10), VTEP1 MAC1 444, and VNI 446, and include those in the outer header. Then, the physical network delivers the unicast packet to VTEP1 220.

Upon receiving the unicast packet, VTEP1 220 parses the received packet, and creates an entry in its own forwarding table 412. For example, using data included in the received unicast packet, VTEP1 220 may fill in forwarding table 412 the following fields: a VM4 MAC4 address 420, a VTEP4 IP4 address 422 (e.g., 10.20.10.11), a VTEP4 MAC4 address 424, and a VNI 426. Then, VTEP1 220 may decapsulate the unicast packet, and deliver the decapsulated packet to VM1 120. The similar process may be implemented by other VTEPs in system 100.

At this point, forwarding table 412 created by VTEP1 220 includes information for communicating with VM4 1122, and forwarding table 432 created by VTEP4 226 includes information for communicating with VM1 120. Also, at this point, VTEP 220 and VTEP 226 may precompute encapsulation headers. There are other ways to obtain this information. For example, instead of using the path learning process, this information may be supplied by a controller itself, and a hypervisor may precompute the headers based on the supplied information.

Precomputing Encapsulation Headers

A process for precomputing encapsulation headers for encapsulated data packets (or frames) may utilize various data structures that are available to the network components. Depending on the configuration of the network, some of the data structures may include data tables or mappings, others may include memory spaces indexed using pointers or the like. The examples of data structures described herein, however, should not be viewed as limiting the presented approach in any way.

In an embodiment, a VXLAN tunnel endpoint maintains several data tables, some of which may be used to precompute encapsulation headers for data packets or frames. Non-limiting examples of the data tables include ARP tables and MAC tables. Both tables may be populated by for example, controller 10, or by performing a path-learning process, such as the process described above with reference to FIGS. 4A-4B.

An ARP table may include a mapping from IP addresses of virtual machines to MAC addresses of the machines. Continuing with the above example, an ARP table accessible to VTEP1 may include a mapping from VM4 IP4 onto VM4 MAC4 that correspond to destination addresses of the destination VM4, and may be indexed using VNI values.

A MAC table may contain a mapping from MAC addresses of virtual machines to network addresses of corresponding VTEPs. For example, a MAC table accessible to VTEP1 may include a mapping from VM4 MAC4 onto <VTEP4 IP4, VTEP4 MAC4>, and may be indexed using VNI values. Non-limiting examples of MAC tables include the forwarding tables described in FIGS. 4A-4B. Other data structures may also be implemented and utilized in the presented approach.

In an embodiment, an approach for precomputing encapsulation headers uses the data structures described above to precompute values of at least some fields of encapsulation headers.

Figure 5:
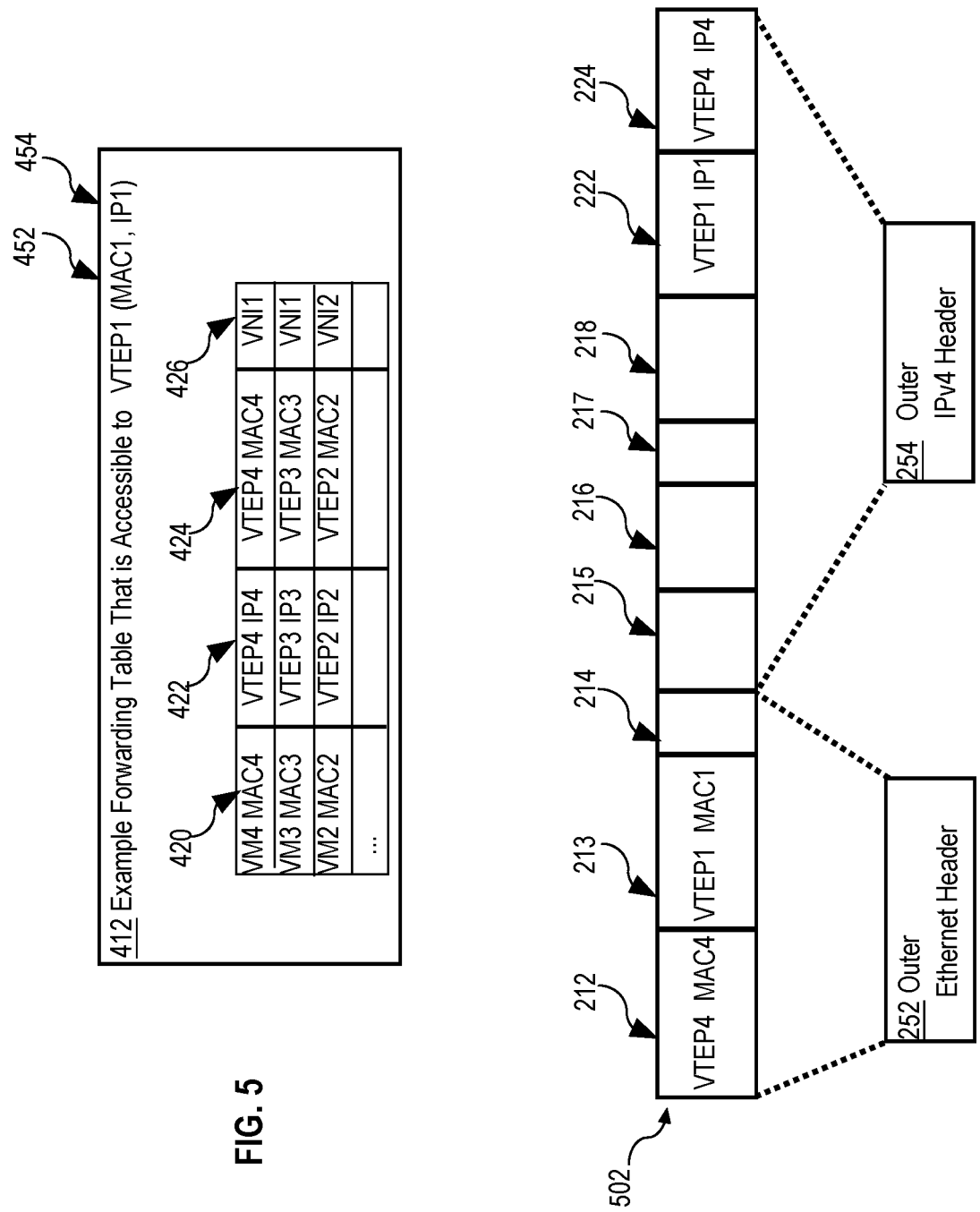
FIG. 5 depicts an example approach for precomputing an encapsulated header.

FIG. 5 depicts an example approach for precomputing an encapsulation header 502. FIG. 5 refers to forwarding table 412 that is described in detail in FIG. 4A. Precomputed encapsulation header 502 includes the fields that are described in FIG. 2-3. Table 412 and precomputed encapsulation header 502 are provided herein merely to explain the process, and depending on the implementation, they may have different forms and contents.

Precomputed encapsulation header 502 has fields 212, 213, 214, 215, 216, 217, 218, 222, 224 that correspond to the certain fields of encapsulation header 250 described in detail in FIG. 3. Data to be entered into various fields of encapsulation header 250, including at least fields 212, 213, 214, 215, 217, 222, 224 may be known in advance. Therefore, fields 212, 213, 214, 215, 217, 222, 224 can be filled in in advance. For example, using data stored in forwarding table 412, the following values may be copied to certain fields of encapsulation header 502: a value VTEP4 MAC4 424 may be copied to field 212, a value VTEP1 MAC1 452 may be copied to field 213, a value VTEP1 IP1 454 may be copied to field 222, and a value VTEP4 IP4 422 may be copied to field 224. Contents of the fields may be set to constant values as described in FIG. 3.

Furthermore, field 218 (a checksum field) of encapsulation header 502 may be initially set to zero, and then updated incrementally as data packets are received from a sender. An example of the process for precomputing the value for the checksum is described in FIG. 6A-6B.

Using the above approach, each VTEP (or virtual switch) may determine its own set of known pairs of <source VTEP, destination VTEP>, precompute encapsulation headers for the pairs, and store the precomputed encapsulation headers in memory or a storage device accessible to the VTEP or the switch.

For example, upon receiving an Ethernet data frame from a source virtual machine, a source VTEP (or a virtual switch) determines a corresponding destination VTEP. The pair <source VTEP IP, destination VTEP IP> may be used a search query issued to a data structure that is used to store the precomputed encapsulation headers. The search query may be used to determine whether an encapsulation header that includes the <source VTEP IP, destination VTEP IP> has been precomputed and stored. If a match is found, then the matching, precomputed encapsulation header is retrieved. The fields in the encapsulation header that are set to zero may be filled in later. The completely filled in encapsulation header is concatenated with the Ethernet frame. The resulting encapsulated frame may have the structure similar to the structure described in FIG. 2.

In an embodiment, values in some of fields 214-217 may have constant values assigned in advance. For example, if all the packets are sent using the same quality of service, then a value associated with the quality of service field in encapsulation header 502 may be set in advance.

Precomputing Checksums

One of the fields in VXLAN encapsulation Ethernet frame 250 is a checksum field. The checksum field is used to store a checksum value computed for the encapsulation header of frame 250. Conventionally, the checksum value is computed for each frame individually; however, computing the checksum value based on the entire content of frame 250 on a per-frame basis may be inefficient and may negatively impact the traffic throughput.

In embodiment, a checksum value is computed using an approach that significantly improves throughput of data traffic. In this approach, a checksum value is computed as a sum of a constant component of the checksum and a variable component of the checksum. The constant component of the checksum may be computed based on values that do not change in the header from a frame-to-frame (of from a packet-to-packet). The variable component of the checksum may be computed based on values that do change in the header for individual frames or packets. The constant component of the checksum may be precomputed in advance and stored. The variable component of the checksum may be computed on a packet-by-packet basis. The variable component of the checksum may be added to the constant component of the checksum to derive the resulting checksum value, which then may be inserted into field 218 of encapsulated frame 218.

Figure 6A:
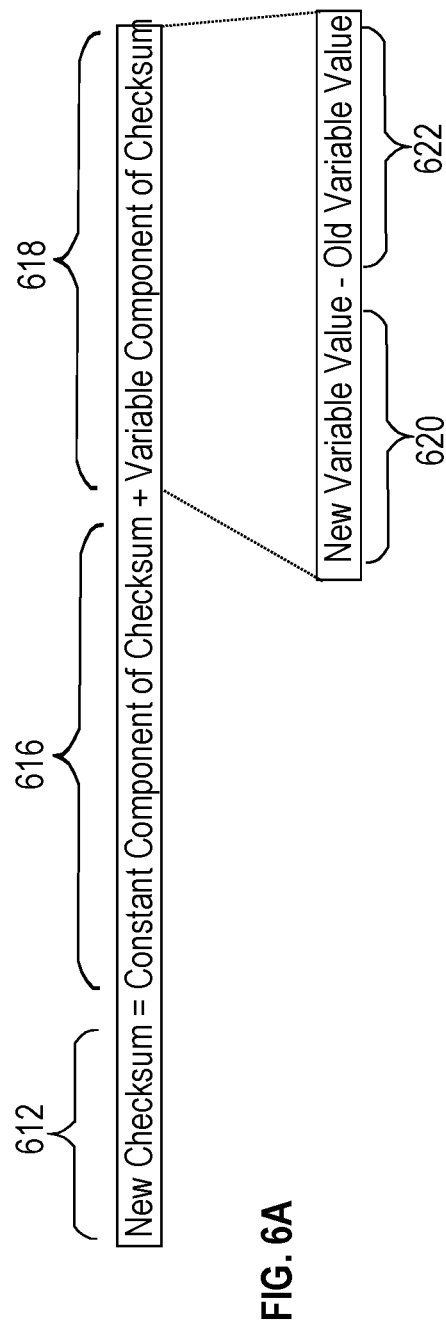
FIG. 6A depicts an example process for determining a checksum.
Figure 6B:
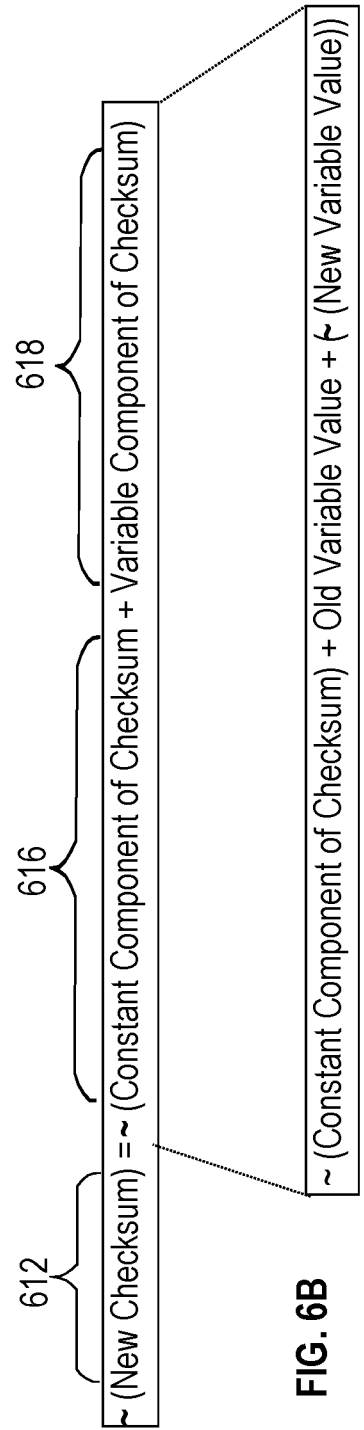
FIG. 6B depicts an example process for determining a checksum.

FIG. 6A-6B depict examples for determining a checksum 612. In particular, FIG. 6A depicts a conceptual example for determining checksum 612, while FIG. 6B depicts an implementation example for determining checksum 612. The difference between the conceptual example depicted in FIG. 6A and the implementation example depicted in FIG. 6B is that the conceptual example illustrates a theoretical approach for computing checksum 612, while the implementation example is suitable for 2's complement machines.

In FIG. 6A, new checksum 612 is computed as a sum of a constant component 616 of the checksum and a variable component 618 of the checksum. Constant component 616 of the checksum may be precomputed in advance and stored. Constant component 616 is computed from values that do not change in the header from a packet-to-packet. These values may include the values in fields 212-213 and the values in fields 222-224 of encapsulated frame 502. There might be some additional values in encapsulated header 502, such a value in a quality of service field, a value in a version field, and the like. Precomputing constant component 616 of the checksum in advance allows saving the CPU power and other resources of the system.

Variable component 618 of the checksum may be computed on a packet-by-packet basis. Variable component 618 of the checksum is computed based on values that do change in the header from a packet-to-packet. These values may include some values in fields 214-215, such as a total length of the packet, a time to live (TTL), flags, a fragment offset, and others. Selection of the values that are included in computation of the variable component 618 depends on the implementation.

In an embodiment, variable component of checksum 618 for a received packet is computed as a difference between a new variable value 620 and an old variable value 622 that might be stored. New variable value 620 is computed based on variable values of the fields in the received packet, while old variable value 622 is computed based on variable values of the fields in the previously received packet.

Once variable component 618 of the checksum are computed, constant component 616 of the checksum may be retrieved, and then constant component 616 and the variable component 618 may be added to obtain new checksum 612, and inserted into field 218 of encapsulated frame 250.

In FIG. 6B, checksum 612 is computed using the implementation example suitable for 2's complement machines. The approach depicted in FIG. 6B is more practical than the approach depicted in FIG. 6A. The approach in FIG. 6A updates checksum 612, rather than the 1's complement of the checksum, ~C, which is the value actually stored in checksum field 218.

In FIG. 6B, a negative of checksum 612 is computed by taking a negative value of a sum of constant component 616 of the checksum and variable component 618 of the checksum. This may also be represented as taking a negative of the sum of constant component 616 of the checksum, old variable value 622 and a negative of new variable value 620.

Example Workflows

Figure 7A:
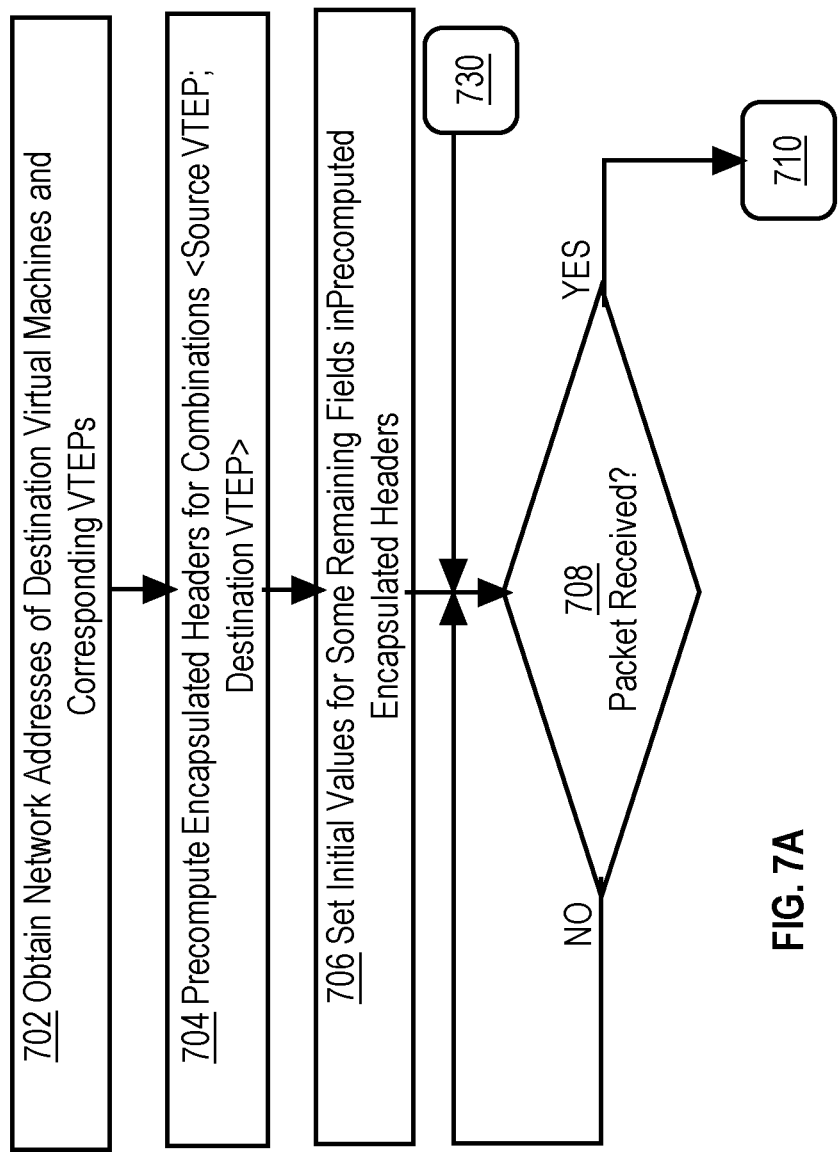
FIG. 7A depicts an example process for precomputing encapsulated headers.

FIG. 7A depicts an example process for precomputing encapsulated headers.

Obtaining Network Addresses for Precomputing Encapsulated Headers

In step 702, a virtual switch, implemented on a host machine, receives, or otherwise obtains, network addresses of source VTEPs that are implemented on the same host on which the virtual switch resides. The network addresses may be obtained from controller 10, or other components of system 100. For simplicity of the description, it is assumed that the virtual switch implements one source VTEP; however, the virtual switch may implement hundreds or thousands of VTEPs.

Also in this step, the virtual switch receives/obtains network addresses of destination virtual machines that are reachable from one or more virtual machines instantiated on the same host machine on which the virtual switch resides. Furthermore, the virtual switch receives/obtains network addresses of destination VTEPs that facilitate communications with the destination virtual machines. The network addresses of the destination virtual machines and corresponding VTEPs may be obtained using for example, the ARP suppression approach. A non-limiting example of such an approach is described in FIG. 4A-4B.

Determining Pairs of <Source VTEP, Destination VTEP>

In step 704, based on information about network addresses of source VTEPs and destination VTEPs, a set of pairs of <source VTEP, destination VTEP> is generated. Since there is a finite count of the source VTEPs and a finite count of destination VTEPs, the set of pairs of <source VTEP, destination VTEP> will also be finite. In a simplified example, if it is assumed that a set of source VTEPs includes just a source VTEP1, and a set of destination VTEPs includes a destination VTEP2 and a destination VTEP4, then the set of pairs will include two pairs, namely <source VTEP1, destination VTEP3> and <source VTEP1, destination VTEP4>.

Precomputing Encapsulated Headers

Also, in step 704, a set of encapsulated headers is precomputed for the set of pairs of source and destination VTEPs. The encapsulated headers may be precomputed based on the information included in forwarding tables, mappings, and the like. For example, for each pair <source VTEP, destination VTEP>, a virtual switch may precompute an encapsulated header that will include the network IP and MAC addresses of the source VTEP, the network IP and MAC addresses of the destination VTEP, and optionally some other values. Continuing with the above example, the network MAC1 address of the source VTEP1 and the network MAC4 address of the destination VTEP4 may form a portion of an outer Ethernet header 252, while the network IP1 address of the source VTEP1 and the network IP4 address of the destination VTEP4 may form a portion of an outer IPv4 header 254, both depicted in FIG. 5.

Initiating Certain Values in Precomputed Encapsulated Headers

In step 706, initial values are entered into one or more fields of the precomputed encapsulated headers. The one or more fields may include the fields that are used to store values that may change from a packet to a packet. The fields may include a checksum field, a time to live field, a total length of the header field, a fragment offset field, and the like. The initial values included in such fields may be zeros. For example, the checksum field may be initially set to zero; however, since an actual value for the checksum field may change from a packet to a packet, the checksum value may be updated as packets are received. An example of computing and updating a checksum is described in FIG. 6A-6B.

Other fields that may be set to initial values may include an Ethernet type field that may be initially set to 0x0800 to indicate that the following header is an IPv4 header. Assuming that the IPv4, not IPv6, is used to facilitate communications in system 100, the value of that field will unlikely change from a packet to a packet.

Storing Precomputed Encapsulated Headers

The precomputed headers may be stored in association with forwarding tables or as separate data structures accessible to the virtual switch and VTEPs.

Receiving Data Packets

In step 708, a test is performed to determine whether a virtual switch received any data packet. If a data packet is received, then step 710 is performed. Otherwise, data packets are awaited in step 708.

FIG. 7B depicts an example process for using precomputed encapsulated headers. In step 710, a data packet is received by a virtual switch.

In step 712, the virtual switch, or a corresponding VTEP, determines an identifier of the virtual port on which the data packet was received. A virtual machine can have multiple virtual network interfaces (VNICs) connected to different logical networks and/or virtual switches. However, for simplicity, let us assume that from the identifier of the virtual port, the VNI associated with the virtual network interface may be obtained. That is because when a virtual machine is associated with a VNI, a controller includes the VNI of the virtual machine as a property of the virtual port. Using the identifier of the virtual port, the virtual switch, or the VTEP, may access a mapping between virtual port identifiers and MAC addresses of virtual network interface that communicate with the virtual switch. Based on the identifier of the virtual port and the mapping, the virtual switch may determine a MAC address of a source virtual network interface that sent the data packet.

Also in step 712, a MAC address of a destination virtual network interface is determined. This may be accomplished using a variety of approaches. For example, the received Ethernet frame may be parsed, and the MAC address of the destination virtual machine may be derived.

Determining a VTEPs Pair for the Received Data Packet

In step 714, a destination VTEP is determined. The destination VTEP may be determined based on the MAC address of the destination virtual machine and contents of a forwarding table. Once the destination VTEP is determined, a search query comprising a pair <source VTEP, destination VTEP> may be formed. The search query may be used to search for a match between the <source VTEP, destination VTEP> pair in the query and the pairs included in the precomputed encapsulated headers.

Determining a Precomputed Encapsulated Header for the VTEPs Pair

In step 716, a test is performed to determine whether an encapsulated header has been precomputed for the pair <source VTEP, destination VTEP>. This may be accomplished by for example, searching all precomputed encapsulated headers and looking for a particular precomputed encapsulated header that includes the source VTEP and the destination VTEP. According to another example, the search query comprising the <source VTEP, destination VTEP> may be issued against a mapping between the <source VTEPs, destination VTEPs> and the corresponding, precomputed encapsulated headers.

If a match is found, then step 720 is performed in which the matching precomputed encapsulated header is used to generate an encapsulated header. Otherwise, step 718 is performed in which an encapsulated header is created based on the information stored in the forwarding tables and mappings.

Generating an Encapsulated Data Packet

In step 722, the encapsulated header is concatenated with the received data packet to form an encapsulated packet. The blank values for the encapsulated header may be computed or determined based on data stored in the forwarding tables, mappings available to the virtual switch, and contents of the data packet itself. This may include updating a checksum value, computing a total length of the packet, and determining values for the remaining fields of the encapsulated header.

Once the encapsulated packet is formed and all fields of the encapsulated packet are filled in, the packet is transmitted to an upload port and directed toward its destination.

In step 730, a virtual switch is redirected to perform step 708 of FIG. 7A, which is described above. The processes depicted in FIG. 7A-7B may be repeated for each data packet received by the switch.

Benefits of Example Embodiments

An approach presented herein provides many benefits that are not obtainable using other approaches. For example, the techniques described herein allow reducing the number of the CPU cycles that are required to create encapsulated data packets or frames because the encapsulated headers are at least partially precomputed in advance. Since the encapsulated headers for the encapsulated packets or frames are at least partially precomputed, the encapsulating the communications exchanged between the virtual machines involves retrieving the already precomputed headers, not generating the encapsulated headers anew on a packet-by-packet basis.

The presented approach also provides benefits in terms of reducing the number of the CPU cycles that are required to compute checksum values for encapsulated packets. The checksum in the precomputed encapsulated headers are initialized with some constant values, such as zeros, and are incrementally updated as data packets and frames are received. Since incremental updates involve less CPU power than computing the checksums from scratch, the presented approach for determining the checksum provides saving in terms of CPU cycles.

The presented approach may be applicable in various types of virtual environment applications and configurations, and may be applicable to a variety of data streams. For example, it may be applicable to the UDP's streams, TCP's streams, and the like.

Extensions and Alternatives

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Implementing Mechanisms

The present approach may be implemented using a computing system comprising one or more processors and memory. The one or more processors and memory may be provided by one or more hardware machines.

Figure 8:
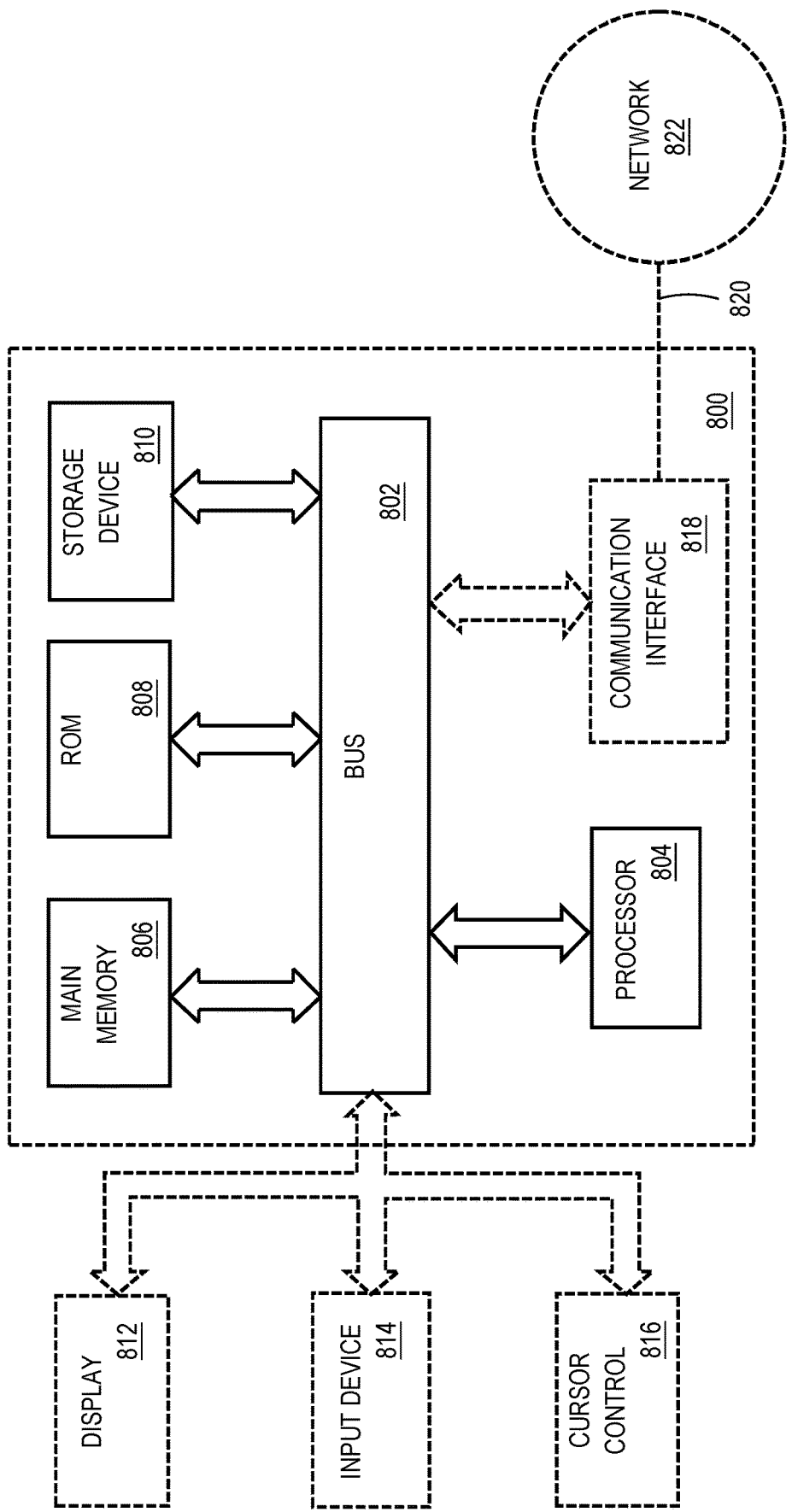
FIG. 8 depicts an example of a basic hardware machine that may be used to implement the present approach.

FIG. 8 depicts an example of a basic hardware machine that may be used to implement the present approach. Hardware machine 800 and its hardware components, including their connections, relationships, and functions, are meant to be exemplary only, and not meant to limit implementations of the present approach. Other hardware machines suitable for implementing the present approach may have different components, including components with different connections, relationships, and functions.

Hardware machine 800 includes a bus 802 or other communication mechanisms for addressing a main memory 806 and for transferring data between and among the various components of hardware machine 800.

Hardware machine 800 also includes a processor 804 coupled with bus 802 for processing information. Processor 804 may be a microprocessor, a system on a chip (SoC), or another hardware processor.

Main memory 806, such as a random-access memory (RAM) or other dynamic storage device, is coupled to bus 802 for storing information and software instructions to be executed by processor 804. Main memory 806 also may be used for storing temporary variables or other intermediate information during execution of software instructions to be executed by processor 804.

Software instructions, when stored in storage media accessible to processor 804, render hardware machine 800 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Hardware machine 800 includes a read-only memory (ROM) 808 or other static storage device coupled to bus 802 for storing static information and software instructions for a processor 804.

A mass storage device 810 is coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 810 may store a body of program and data for directing operation of hardware machine 800, including an operating system, user application programs, drivers, and other support files, as well as other data files.

Hardware machine 800 may be coupled via bus 802 to a display 812, such as a liquid crystal display (LCD) or other electronic visual display, for displaying information to a computer user. A touch sensitive surface incorporating touch detection technology (e.g., resistive, capacitive, etc.) may be incorporated with display 812 to form a touch sensitive display for communicating touch gesture (e.g., finger or stylus) input to processor 804.

An input device 814 may be coupled to bus 802 for communicating information and command selections to processor 804. Input device 814 may include alphanumeric and other keys. Input device 814 may include one or more physical buttons or switches such as, for example, a power (on/off) button, a "home" button, volume control buttons, or the like.

A cursor control 816, such as a mouse, a trackball, touchpad, touch-sensitive surface, or cursor direction keys for communicating direction information and command selections to processor 804 and for controlling cursor movement on display 812, may be coupled to bus 802. Cursor control 816 may have two degrees of freedom in two axes: a first axis (e.g., x) and a second axis (e.g., y) that allow the device to specify positions in a plane. Cursor control 816 may have more degrees of freedom with a third axis (e.g., z).

For example, cursor control 816 may have three translational degrees of freedom (e.g., surge, heave, and sway) in three perpendicular axes, that allows the device to specify position in the three axes. Cursor control 816 may have three rotational degrees of freedom (e.g., pitch, yaw, roll) about three perpendicular axes, that allows the device to specify an orientation about the three axes.

While one or more of display 812, input device 814, and cursor control 816 may be external components (i.e., peripheral devices) of hardware machine 800, some or all of display 812, input device 814, and cursor control 816 may be integrated as part of the form factor of hardware machine 800.

A function or operation of the present approach may be performed by hardware machine 800 in response to processor 804 executing one or more programs of software instructions contained in main memory 806. Such software instructions may be read into main memory 806 from another storage medium, such as a storage device 810. Execution of the software instructions contained in main memory 806 may cause processor 804 to perform various functions and operations.

While a function or operation of the present approach may be implemented entirely with software instructions, hard-wired or programmable circuitry of hardware machine 800 (e.g., an ASIC, a FPGA, or the like) may be used in place of or in combination with software instructions to perform the function or operation.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor 804 for execution. For example, the software instructions may initially be carried on a magnetic disk or solid-state drive of a remote computer. The remote computer can load the software instructions into its dynamic memory and send the software instructions over a data communications network. Hardware machine 800 can receive the data over the data communications network and appropriate circuitry can place the data on bus 802. Bus 802 carries the data to main memory 806, from which processor 804 retrieves and executes the software instructions. The software instructions received by main memory 806 may optionally be stored on storage device 810 either before or after execution by processor 804.

Hardware machine 800 may include a communication interface 818 coupled to bus 802. Communication interface 818 provides a two-way data communication coupling to a wired or wireless network link 820 that connects hardware machine 800 to a data communications network 822 (e.g., a local area network (LAN), a wide area network (WAN), a wireless local area network (WLAN), a metropolitan area network (MAN), a storage area network (SAN), etc.). Network link 820 provides data communication through network 822 to one or more other networked devices.

Communication interface 818 may send and receive electrical, electromagnetic, or optical signals that carry digital data streams representing various types of information. For example, communication interface 818 may be implemented by a wired network interface card, a wireless network interface card with an integrated radio antenna, or a modem.

Network link 820 may provide a connection through network 822 to a host computer or to data equipment operated by an Internet Service Provider (ISP). The ISP may in turn provide data communication services through the world-wide packet data communication network now commonly referred to as the "Internet". Network 822 and Internet use electrical, electromagnetic or optical signals that carry digital data streams. The signals through the various networks and the signals on network link 820 and through communication interface 818, which carry the digital data to and from hardware machine 800, are example forms of transmission media.

Hardware machine 800 can send messages and receive data, including program code, through network 822, network link 820, and communication interface 818. In the Internet example, a server might transmit a requested code for an application program through Internet, ISP, and network 822 and communication interface 818.

The received code may be executed by processor 804 as it is received, and/or stored in storage device 810, or other non-volatile storage for later execution.

Figure 9:
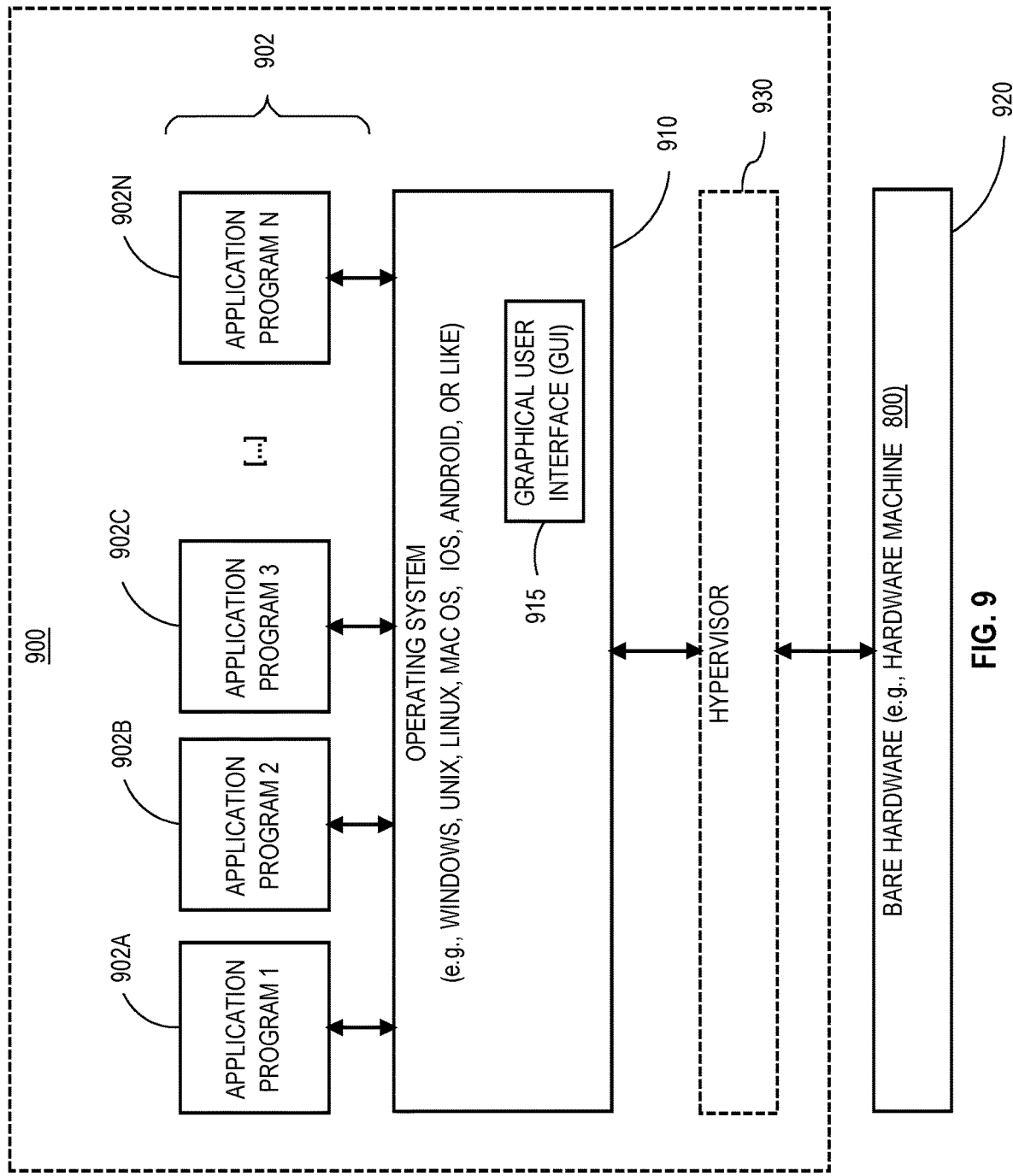
FIG. 9 depicts an example of a basic software system for controlling the operation of a basic hardware machine.

FIG. 9 depicts an example of a basic software system 900 for controlling the operation of a basic hardware machine 800 of FIG. 8, according to an embodiment of the present approach. Software system 900 and its software components, including their connections, relationships, and functions, is meant to be exemplary only, and not meant to limit implementations of the present approach. Other software systems suitable for implementing the present approach may have different components, including components with different connections, relationships, and functions.

Software system 900 is provided for directing the operation of hardware machine 700. Software system 900 may be stored in system memory (RAM) 806 and on fixed storage (e.g., hard disk or flash memory) 810.

Software system 900 includes a kernel or operating system (OS) 910. OS 910 manages low-level aspects of computer operation, including managing execution of processes, memory allocation, file input and output (I/O), and device I/O.

Software system 900 includes one or more application programs, represented as 902A, 902B, 902C ... 902N, that may be transferred from fixed storage 710 into memory 706 for execution by hardware machine 800. The applications or other software intended for use on hardware machine 800 may also be stored as a set of downloadable computer-executable instructions, for example, for downloading and installation from an Internet location (e.g., a Web server, an application store, or other online services).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. GUI 915 also serves to display the results of operation from the OS 910 and applications 902, whereupon the user may supply additional inputs or terminate the session (e.g., log off).

Software system 900 can execute directly on bare hardware 920 (e.g., machine 800). Alternatively, a "Type-1" hypervisor 930 may be interposed between the bare hardware 920 and OS 910 as part of software system 900. Hypervisor 930 acts as a software "cushion" or virtualization layer between the OS 910 and bare hardware 920. Hypervisor 930 instantiates and runs one or more virtual machine instances. Each virtual machine instance comprises a "guest" operating system, such as OS 910, and one or more applications, such as applications 902, designed to execute on the guest operating system. Hypervisor 930 presents the guest operating systems with a virtual operating platform and manages the execution of the guest operating systems.

Hypervisor 930 may allow a guest operating system to run as if it is running on bare hardware 920 directly. In this case, the guest operating system as configured to execute on bare hardware 920 can also execute on hypervisor 930. In other words, hypervisor 930 may provide full hardware virtualization to the guest operating system. Alternatively, hypervisor 930 may provide para-virtualization to the guest operating system. In this case, the guest operating system is "aware" that it executes on hypervisor 930 and is specially designed or configured to execute on hypervisor 930.

General Considerations

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a virtual switch implemented on a host computer to precompute encapsulated headers for data communications transmitted via one or more computer-based communications networks, the method comprising:

obtaining a plurality of network addresses of a plurality of intermediaries that facilitate communications between a plurality of virtual machines;

based on, at least in part, the plurality of network addresses of the plurality of intermediaries, determining a set of source-destination intermediary pairs;

for each source-destination intermediary pair, from the set of source-destination intermediary pairs, generating a precomputed encapsulated header, and including the precomputed encapsulated header in a set of precomputed encapsulated headers;

determining whether a data packet from a particular source intermediary and destined to a particular destination intermediary, of the plurality of intermediaries, has been received;

in response to determining that the data packet from the particular source intermediary and destined to the particular destination intermediary has been received:

determining whether a particular precomputed encapsulated header for the particular source intermediary and the particular destination intermediary is included in the set of precomputed encapsulated headers;

in response to determining that the particular precomputed encapsulated header for the particular source intermediary and the particular destination intermediary is included in the set of precomputed encapsulated headers:

retrieving the particular precomputed encapsulated header from the set of precomputed encapsulated headers; and concatenating, in a single copying step, the particular precomputed encapsulated header with the data packet to form a particular encapsulated packet;

wherein the particular precomputed encapsulated header comprises a string that includes an outer source IP address of the particular source intermediary and an outer destination IP address of the particular destination intermediary.

2. The method of claim 1, wherein the particular precomputed encapsulated header is precomputed prior to receiving the data packet, and by including, in the particular precomputed encapsulated header, source network addresses of the particular source intermediary and destination network addresses of the particular destination intermediary;

wherein the source network addresses of the particular source intermediary include an IP address and a MAC address of the particular source intermediary; and wherein the destination network addresses of the particular destination intermediary include an IP address and a MAC address of the particular destination intermediary.

3. The method of claim 1, wherein the particular source intermediary is identified by a source IP address and a source MAC address of the particular source intermediary;
wherein the particular destination intermediary is identified by a destination IP address and a destination MAC address of the particular destination intermediary;
wherein the particular source intermediary is a particular source Tunnel EndPoint (TEP); and
wherein the particular destination intermediary is a particular destination TEP.

4. The method of claim 1, wherein the plurality of network addresses of the plurality of intermediaries is obtained from a network controller or by executing an address resolution approach; and
wherein the plurality of network addresses of the plurality of intermediaries is stored in one or more forwarding tables.

5. The method of claim 1, further comprising:
prior to receiving the data packet, entering one or more initial values into one or more variable-content fields in the precomputed encapsulated header;
wherein the one or more variable-content fields comprise a checksum field;
wherein the checksum field is initially set to zero; and
after receiving the data packet:
  determining a constant component of a checksum and a variable component of the checksum;
  entering the constant component of the checksum into a checksum field of the particular precomputed encapsulated header;
  based on, at least in part, the constant component of the checksum and the variable component of the checksum, determining a checksum value; and
  entering the checksum value into the particular encapsulated packet.

6. The method of claim 1, further comprising:
prior to receiving the data packet:
  determining one or more data fields in the particular precomputed encapsulated header that have not yet been precomputed in the particular precomputed encapsulated header;
  determining one or more data values for the one or more data fields in the particular precomputed encapsulated header; and
  entering the one or more data values into the one or more data fields in the particular precomputed encapsulated header.

7. The method of claim 1, further comprising:
in response to determining that the particular precomputed encapsulated header for the particular source intermediary and the particular destination intermediary is not included in the set of precomputed encapsulated headers:
  obtaining a plurality of network addresses of the plurality of virtual machines that communicate with each other via the one or more communications networks;
  based on, at least in part, the plurality of network addresses of the plurality of intermediaries and the plurality of network addresses of the plurality of virtual machines, generating a substitute encapsulated header;
  including the substitute encapsulated header in the set of precomputed encapsulated headers; and
  concatenating the substitute encapsulated header with the data packet to form the particular encapsulated packet.

8. One or more non-transitory computer-readable storage medium storing one or more computer instructions which, when executed by one or more processors, cause the one or more processors to perform:
obtaining a plurality of network addresses of a plurality of intermediaries that facilitate communications between a plurality of virtual machines;
based on, at least in part, the plurality of network addresses of the plurality of intermediaries, determining a set of source-destination intermediary pairs;
for each source-destination intermediary pair, from the set of source-destination intermediary pairs, generating a precomputed encapsulated header, and including the precomputed encapsulated header in a set of precomputed encapsulated headers;
determining whether a data packet from a particular source intermediary and destined to a particular destination intermediary, of the plurality of intermediaries, has been received;
in response to determining that the data packet from the particular source intermediary and destined to the particular destination intermediary has been received:
  determining whether a particular precomputed encapsulated header for the particular source intermediary and the particular destination intermediary is included in the set of precomputed encapsulated headers;
  in response to determining that the particular precomputed encapsulated header for the particular source intermediary and the particular destination intermediary is included in the set of precomputed encapsulated headers:
    retrieving the particular precomputed encapsulated header from the set of precomputed encapsulated headers; and
    concatenating, in a single copying step, the particular precomputed encapsulated header with the data packet to form a particular encapsulated packet;
  wherein the particular precomputed encapsulated header comprises a string that includes an outer source IP address of the particular source intermediary and an outer destination IP address of the particular destination intermediary.

9. The one or more non-transitory computer-readable storage medium of claim 8, wherein the particular precomputed encapsulated header is precomputed prior to receiving the data packet, and by including, in the particular precomputed encapsulated header, source network addresses of the particular source intermediary and destination network addresses of the particular destination intermediary;
wherein the source network addresses of the particular source intermediary include an IP address and a MAC address of the particular source intermediary; and
wherein the destination network addresses of the particular destination intermediary include an IP address and a MAC address of the particular destination intermediary.

10. The one or more non-transitory computer-readable storage medium of claim 8, wherein the particular source intermediary is identified by a source IP address and a source MAC address of the particular source intermediary;

wherein the particular destination intermediary is identified by a destination IP address and a destination MAC address of the particular destination intermediary;

wherein the particular source intermediary is a particular source Tunnel EndPoint (TEP); and wherein the particular destination intermediary is a particular destination TEP.

11. The one or more non-transitory computer-readable storage medium of claim 8, wherein the plurality of network addresses of the plurality of intermediaries is obtained from a network controller or by executing an address resolution approach; and wherein the plurality of network addresses of the plurality of intermediaries is stored in one or more forwarding tables.

12. The one or more non-transitory computer-readable storage medium of claim 8, storing additional instructions which, when executed by the one or more processors, cause the one or more processors to perform:

prior to receiving the data packet, entering one or more initial values into one or more variable-content fields in the precomputed encapsulated header;

wherein the one or more variable-content fields comprise a checksum field;

wherein the checksum field is initially set to zero; and after receiving the data packet:

determining a constant component of a checksum and a variable component of the checksum;

entering the constant component of the checksum into a checksum field of the particular precomputed encapsulated header;

based on, at least in part, the constant component of the checksum and the variable component of the checksum, determining a checksum value; and entering the checksum value into the particular encapsulated packet.

13. The one or more non-transitory computer-readable storage medium of claim 8, storing additional instructions which, when executed by the one or more processors, cause the one or more processors to perform:

prior to receiving the data packet:

determining one or more data fields in the particular precomputed encapsulated header that have not yet been precomputed in the particular precomputed encapsulated header;

determining one or more data values for the one or more data fields in the particular precomputed encapsulated header; and entering the one or more data values into the one or more data fields in the particular precomputed encapsulated header.

14. The one or more non-transitory computer-readable storage medium of claim 8, storing additional instructions which, when executed by the one or more processors, cause the one or more processors to perform:

in response to determining that the particular precomputed encapsulated header for the particular source intermediary and the particular destination intermediary is not included in the set of precomputed encapsulated headers:

obtaining a plurality of network addresses of the plurality of virtual machines that communicate with each other via one or more communications networks;

based on, at least in part, the plurality of network addresses of the plurality of intermediaries and the plurality of network addresses of the plurality of virtual machines, generating a substitute encapsulated header;

including the substitute encapsulated header in the set of precomputed encapsulated headers; and concatenating the substitute encapsulated header with the data packet to form the particular encapsulated packet.

15. A virtual switch implemented in a host computer and configured to precompute encapsulated headers for transmitting data communications between virtual machines via one or more computer-based communications networks, the virtual switch comprising:

one or more processors;

one or more memory units; and one or more non-transitory computer-readable storage medium storing one or more computer instructions which, when executed by the one or more processors, cause the one or more processors to perform:

obtaining a plurality of network addresses of a plurality of intermediaries that facilitate communications between a plurality of virtual machines;

based on, at least in part, the plurality of network addresses of the plurality of intermediaries, determining a set of source-destination intermediary pairs;

for each source-destination intermediary pair, from the set of source-destination intermediary pairs, generating a precomputed encapsulated header, and including the precomputed encapsulated header in a set of precomputed encapsulated headers;

determining whether a data packet from a particular source intermediary and destined to a particular destination intermediary, of the plurality of intermediaries, has been received;

in response to determining that the data packet from the particular source intermediary and destined to the particular destination intermediary has been received:

determining whether a particular precomputed encapsulated header for the particular source intermediary and the particular destination intermediary is included in the set of precomputed encapsulated headers;

in response to determining that the particular precomputed encapsulated header for the particular source intermediary and the particular destination intermediary is included in the set of precomputed encapsulated headers:

retrieving the particular precomputed encapsulated header from the set of precomputed encapsulated headers; and concatenating, in a single copying step, the particular precomputed encapsulated header with the data packet to form a particular encapsulated packet;

wherein the particular precomputed encapsulated header comprises a string that includes an outer source IP address of the particular source intermediary and an outer destination IP address of the particular destination intermediary.

16. The virtual switch of claim 15, wherein the particular precomputed encapsulated header is precomputed prior to receiving the data packet, and by including, in the particular precomputed encapsulated header, source network addresses of the particular source intermediary and destination network addresses of the particular destination intermediary;

wherein the source network addresses of the particular source intermediary include an IP address and a MAC address of the particular source intermediary; and wherein the destination network addresses of the particular destination intermediary include an IP address and a MAC address of the particular destination intermediary.

17. The virtual switch of claim 15, wherein the particular source intermediary is identified by a source IP address and a source MAC address of the particular source intermediary;
   wherein the particular destination intermediary is identified by a destination IP address and a destination MAC address of the particular destination intermediary;
   wherein the particular source intermediary is a particular source Tunnel EndPoint (TEP); and
   wherein the particular destination intermediary is a particular destination TEP.

18. The virtual switch of claim 15, wherein the plurality of network addresses of the plurality of intermediaries is obtained from a network controller or by executing an address resolution approach; and
   wherein the plurality of network addresses of the plurality of intermediaries is stored in one or more forwarding tables.

19. The virtual switch of claim 15, wherein the computer instructions comprise additional instructions which, when executed by the one or more processors, cause the one or more processors to perform:
   prior to receiving the data packet, entering one or more initial values into one or more variable-content fields in the precomputed encapsulated header;
   wherein the one or more variable-content fields comprise a checksum field;
   wherein the checksum field is initially set to zero; and
   after receiving the data packet:
      determining a constant component of a checksum and a variable component of the checksum;
      entering the constant component of the checksum into a checksum field of the particular precomputed encapsulated header;
      based on, at least in part, the constant component of the checksum and the variable component of the checksum, determining a checksum value; and
      entering the checksum value into the particular encapsulated packet.

20. The virtual switch of claim 15, wherein the computer instructions comprise additional instructions which, when executed by the one or more processors, cause the one or more processors to perform:
   prior to receiving the data packet:
      determining one or more data fields in the particular precomputed encapsulated header that have not yet been precomputed in the particular precomputed encapsulated header;
      determining one or more data values for the one or more data fields in the particular precomputed encapsulated header; and
      entering the one or more data values into the one or more data fields in the particular precomputed encapsulated header.

* * * * *